United States Patent
Navarro et al.

(10) Patent No.: US 9,738,751 B2
(45) Date of Patent: Aug. 22, 2017

(54) METHOD FOR PREPARING A POLYMER FROM AT LEAST ONE CYCLIC MONOMER

(75) Inventors: Christophe Navarro, Lahonce (FR);
Damien Delcroix, Castelsarrasin (FR);
Blanca Martin-Vaca, Toulouse (FR);
Didier Bourissou, Plaisance du Touch (FR)

(73) Assignees: Arkema France, Colombes (FR);
Centre National De La Recherche Scientifique, Paris (FR)

( * ) Notice: Subject to any disclaimer, the term of this patent is extended or adjusted under 35 U.S.C. 154(b) by 1336 days.

(21) Appl. No.: 14/421,069

(22) PCT Filed: Dec. 7, 2010

(86) PCT No.: PCT/FR2010/052624
§ 371 (c)(1),
(2), (4) Date: Apr. 8, 2015

(87) PCT Pub. No.: WO2011/070282
PCT Pub. Date: Jun. 16, 2011

(65) Prior Publication Data
US 2015/0218306 A1    Aug. 6, 2015

(30) Foreign Application Priority Data
Dec. 8, 2009 (FR) .................. 09 58742

(51) Int. Cl.
| | |
|---|---|
| C08G 63/02 | (2006.01) |
| C08G 63/08 | (2006.01) |
| C08G 63/82 | (2006.01) |
| C08G 63/91 | (2006.01) |
| C08G 64/38 | (2006.01) |
| C08G 65/10 | (2006.01) |
| C08G 69/20 | (2006.01) |

(52) U.S. Cl.
CPC ......... *C08G 63/08* (2013.01); *C08G 63/823* (2013.01); *C08G 63/912* (2013.01); *C08G 63/916* (2013.01); *C08G 64/38* (2013.01); *C08G 65/10* (2013.01); *C08G 69/20* (2013.01)

(58) Field of Classification Search
CPC .................... C08L 67/04; C08G 63/08
USPC .......... 514/421, 422; 528/271, 272; 525/411
See application file for complete search history.

(56) References Cited

U.S. PATENT DOCUMENTS

| | | | |
|---|---|---|---|
| 3,476,715 | A | 11/1969 | Wagner |
| 3,846,357 | A | 11/1974 | Morival |
| 5,026,818 | A | 6/1991 | Heinz |
| 2009/0048423 | A1 | 2/2009 | Stopek |
| 2009/0171065 | A1 | 7/2009 | Nakamura |
| 2010/0121024 | A1 | 5/2010 | Magnet |

FOREIGN PATENT DOCUMENTS

| | | |
|---|---|---|
| CN | 1470545 | 1/2004 |
| CN | 101371933 | 2/2009 |
| CN | 101384641 | 3/2009 |
| EP | 1972649 | 9/2008 |
| EP | 2028209 | 2/2009 |
| GB | 1090527 | 11/1967 |
| JP | 02115227 | 4/1990 |
| JP | 04292620 | 10/1992 |
| JP | 2006274253 | 10/2006 |
| JP | 2009209224 | 9/2009 |
| WO | 9518170 | 7/1995 |
| WO | 2008104724 | 9/2008 |

OTHER PUBLICATIONS

Basko, M., et al., "Cationic Copolymerization of E-Caprolactone and L,L-Lactide by an Activated Monomer Mechanism," Jul. 31, 2006, pp. 7071-7081, vol. 44, Journal of Polymer Science: Part A: Polymer Chemistry.
International Preliminary Report on Patentability and English Translation of the Written Opinion of the International Searching Authority for PCT/FR2010/052624 mailed Aug. 2, 2011.
International Search Report for International Application No. PCT/FR2010/052624 mailed Aug. 2, 2011.
Lou, X., et al., "Living Cationic Polymerization of Delta-Valerolactone and Synthesis of High Molecular Weight Homopolymer and Asymmetric Telechelic and Block Copolymer," 2002, pp. 1190-1195, vol. 35, No. 4, Macromolecules.

*Primary Examiner* — Terressa Boykin
(74) *Attorney, Agent, or Firm* — RatnerPrestia

(57) ABSTRACT

The present invention relates to a method for preparing a copolymer from at least one cyclic monomer selected from: a lactone, a lactam, a carbonate, a lactide and a glycolide, an oxazoline, an epoxide, a cyclosiloxane, comprising the step consisting of reacting said cyclic monomer in the presence of a substituted phosphorus-containing compound.
It also relates to the polymer composition obtained according to this method, as well as the uses thereof, notably as antistatic additives, biocompatible materials, as membranes for treatment of effluents or in electrochemical systems for energy storage.

21 Claims, No Drawings

METHOD FOR PREPARING A POLYMER FROM AT LEAST ONE CYCLIC MONOMER

CROSS-REFERENCE TO RELATED APPLICATIONS

This is a National Phase filing of International Application No. PCT/FR2010/052624, filed Dec. 7, 2010, which claims priority from French Application No. 0958742, filed Dec. 8, 2009, the entire disclosure of each of these applications being incorporated herein by reference in its entirety for all purposes.

FIELD OF THE INVENTION

The present invention relates to a method for preparing (co)polymers from at least one cyclic monomer selected from lactones, carbonates, lactams, lactides or glycolides, oxazolines, epoxides, cyclosiloxanes by ring opening catalyzed by a substituted phosphorus-containing compound, optionally in the presence of an initiator bearing a hydroxyl or thiol function, as well as the compositions thus obtained and the use thereof.

BACKGROUND OF THE RELATED ART

Generally, methods of ring-opening polymerization use metal compounds, which are likely to pose problems of contamination or of compatibility in contact with foods or with living tissues. Other methods use acids, which are corrosive in the manufacturing processes.

The (co)polymers of lactones such as ε-caprolactone are polymers that are of industrial interest in various fields, notably on account of their biocompatibility, their physicochemical properties and their good thermal stability up to temperatures of at least 200-250° C.

A method for preparing these copolymers was notably described by Jérome et al. in *Macromol*, 2002, 35, 1190-1195. It consists of copolymerizing δ-valerolactone with a macroinitiator, either poly(ethylene glycol) or monomethoxypoly(ethylene glycol), in the presence of ethereal hydrochloric acid ($HCl.Et_2O$) in dichloromethane at 0° C. This method uses a monomer concentration of 3 mol·$l^{-1}$, 3 equivalents of acid relative to the hydroxyl functions of the macroinitiator, and the diblock and triblock polymers obtained after 2-3 h have maximum number-average molecular weights $M_n$ from 9500 to 19,000 g/mol, with a polydispersity index from 1.07 to 1.09.

This method requires the use of a relatively large amount of acid, which is moreover corrosive, and may cause deterioration of the equipment used. Moreover, the presence of an initiator is beneficial for controlling the molecular weights of the polymers.

Other methods for cationic copolymerization of ε-caprolactone have been proposed, which employ a sulfonic acid as catalyst instead of hydrochloric acid. The presence of an initiator is also necessary in these methods.

Such a method was notably described by Malgorzata Basko et al. in *Journal of Polymer Science: Part A: Polymer Chemistry*, Vol. 44, 7071-7081 (2006). It consists of reacting ε-caprolactone and optionally L,L-lactide in the presence of isopropyl alcohol and trifluoromethanesulfonic (triflic) acid, in dichloromethane at 35° C. Caprolactone copolymers having a number-average molecular weight $M_n$ in the range from 4780 to 5900 g·mol and a polydispersity index from 1.21 to 1.24 can be obtained in this way.

Polyamides, whose industrial interest requires no further demonstration, can be prepared by ring-opening polymerization. Among the techniques used, cationic polymerization based on acid, notably phosphoric, has been described extensively in the literature. Reference may be made in particular to application U.S. Pat. No. 3,846,357 of the present applicant.

For their part, carbonates, lactides and glycolides can be polymerized by various methods, mostly employing metal compounds.

However, it is not suggested that a method of the types described above can be used for preparing, in conditions that are generally mild and with rapid reaction kinetics, copolymers of lactones, lactams, carbonates, lactides or glycolides, oxazolines, epoxides, cyclosiloxanes in the presence of a substituted phosphorus-containing compound, optionally with an initiator bearing at least one hydroxyl or thiol function, the copolymers obtained possibly having a high number-average molecular weight $M_n$ (optionally above 25 000 g/mol), a low polydispersity index (less than or equal to 1.5) and formation of stereocontrolled chains. A catalytic system employing substituted phosphorus-containing compounds of this type has the advantage of avoiding the use of metal compounds or highly acidic compounds. Moreover, it allows stereocontrolled chains to be obtained.

SUMMARY OF THE INVENTION

The present invention thus relates to a method for preparing a polymer or a copolymer from at least one cyclic monomer selected from: a lactone, a lactam, a carbonate, a lactide, a glycolide, an oxazoline, an epoxide, a cyclosiloxane, comprising a step consisting of reacting the cyclic monomer or monomers in the presence of a substituted phosphorus-containing compound, and optionally at least one initiator bearing a hydroxyl or thiol function. This method is described as "mild" as the temperature conditions, in particular, permit polymerization starting at room temperature, without using metals, and a large variety of solvents can be used, in particular nonchlorinated solvents.

The invention also relates to a polymer composition obtainable by the above method, and which will now be described in more detail, as well as uses of these compositions.

DETAILED DESCRIPTION OF CERTAIN EMBODIMENTS OF THE INVENTION

The method according to the invention can be described as organo-catalytic.

Firstly, it is to be noted that the expression "between" used in the context of this description is to be understood as including the limits of the range stated.

The method according to the invention relates to the preparation of a polymer or copolymer from at least one cyclic monomer selected from: a lactone, a lactam, a carbonate, a lactide and a glycolide, an oxazoline, an epoxide, a cyclosiloxane, comprising the step consisting of reacting the cyclic monomer or monomers in the presence of a substituted phosphorus-containing compound.

According to a second embodiment of the invention, the method according to the invention relates to the preparation of a polymer or copolymer from at least one cyclic monomer selected from: a lactone, a lactam, a carbonate, a lactide and a glycolide, an oxazoline, an epoxide, a cyclosiloxane, comprising the step consisting of reacting said cyclic monomer in the presence of a substituted phosphorus-containing compound, in the presence of at least one initiator bearing a hydroxyl or thiol function.

"Copolymer" means in particular a polymer derived from at least two different species of monomers, selected from a lactone, a lactam, a carbonate, a lactide or a glycolide (called more simply "cyclic monomer" hereinafter).

When an initiator is present, it will be integrated in the macromolecular chain. The initiator can be quite a small molecule, such as water, pentanol. It can also be an oligomer or a polymer, thus the product of reaction with the cyclic monomers will be a block copolymer.

Lactone means monomers corresponding to the following formula:

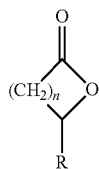

where n is an integer from 1 to 20 and R represents a hydrogen or a linear or branched alkyl group with 1 to 4 carbons.

Examples of lactones comprise more particularly the saturated or unsaturated, substituted or unsubstituted β-, γ-, δ- and ε-lactones having from 4 to 11 carbon atoms, such as ε-caprolactone, δ-valerolactone, γ-butyrolactone, racemic or nonracemic δ-caprolactone, racemic or nonracemic β-butyrolactone. ε-Caprolactone is preferred for use in the present invention.

Examples of lactams comprise more particularly saturated or unsaturated, substituted or unsubstituted β-, γ-, δ- and ε-lactams, containing from 4 to 12 carbon atoms, such as caprolactam, pyrrolidinone, piperidone, enantholactam and lauryllactam. Caprolactam and lauryllactam are preferred for use in the present invention.

The substituted dioxanediones, such as lactide, used in the present invention, can be in racemic, enantiomerically pure or meso form.

The carbonates used in the invention are cyclic carbonates of the following formula I:

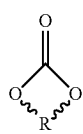

(I)

where R denotes a linear alkyl group containing from 2 to 20 carbon atoms or a branched alkyl or alkaryl group containing from 2 to 20 carbon atoms, optionally substituted with one or more substituents selected independently from oxo and halo groups, for example fluorine, chlorine, bromine or iodine or hydroxyl. In particular, trimethylene carbonate, and derivatives thereof, as well as glycerol carbonate are preferred.

"Initiator" means, in the present description, a compound having at least one hydroxyl function or at least one thiol function. The initiator can be water or hydrogen sulfide, a compound of low molecular weight such as pentanol or propanethiol, as well as an oligomer or a polymer.

When the initiator is an oligomer or a polymer, it can be mono- or polyhydroxylated, notably selected from: (alkoxy) polyalkylene glycols, such as (methoxy)polyethylene glycol (MPEG/PEG), polypropylene glycol (PPG) and polytetramethylene glycol (PTMG); poly(alkyl)alkylene adipate diols such as poly(2-methyl-1,3-propylene adipate)diol (PMPA) and poly(1,4-butylene adipate)diol (PBA); polydienes, optionally hydrogenated, α-hydroxylated or α,ω-dihydroxylated, such as α,ω-dihydroxylated polybutadiene or α,ω-dihydroxylated polyisoprene; mono- or polyhydroxylated polyalkylenes such as mono- or polyhydroxylated polyisobutylene; polylactides containing terminal hydroxyl functions; polyhydroxyalkanoates such as poly(3-hydroxybutyrate) and poly(3-hydroxyvalerate); polysaccharides and small sugars (mono- and oligo-saccharides), modified or unmodified, such as starch, chitin, chitosan, dextran, cellulose, sucrose, and isomaltulose; and mixtures thereof.

As a variant, the initiator can be an oligomer or a polymer bearing one or more thiol functions, such as α-thiolated or α,ω-thiolated polystyrenes, α-thiolated or α,ω-thiolated poly(meth)acrylates, α-thiolated or α,ω-thiolated polybutadienes, and mixtures thereof.

According to another possibility, the initiator can be a vinyl co-oligomer or copolymer from the family of acrylic, methacrylic, styrene or diene polymers, resulting from copolymerization between acrylic, methacrylic, styrene or diene monomers and functional monomers having a hydroxyl group, such as hydroxylated acrylic or methacrylic monomers, for example 4-hydroxybutyl acrylate, hydroxyethyl acrylate and hydroxyethyl methacrylate. This polymerization can be carried out according to a conventional radical method, a controlled radical method or an ionic method.

According to yet another possibility, the initiator can be a vinyl copolymer obtained by controlled radical polymerization in which the radical initiator and/or the control agent bear at least one hydroxyl or thiol function. The oligomers and polymers used as initiators can have, for example, a number-average molecular weight in the range from 1000 to 100,000 g/mol, for example from 1000 to 20,000 g/mol and a polydispersity index in the range from 1 to 3 and for example from 1 to 2.6.

The use of said oligomers or polymers makes it possible to obtain linear, star or grafted block copolymers, depending on the arrangement of the hydroxyl or thiol function or function(s) on the oligomeric or polymeric initiator.

Preferably, the molar ratio of the cyclic monomer to the polymeric initiator is in the range from 5 to 500, more preferably from 10 to 200 and, even better, from 40 to 100.

The method according to the invention requires the use of a catalyst, which comprises or preferably consists of a substituted phosphorus-containing compound.

The molar ratio of the substituted phosphorus-containing compound to each hydroxyl or thiol function of the polymeric initiator is from 1 to 3.

"Substituted phosphorus-containing compound" refers to compounds having the following structures:

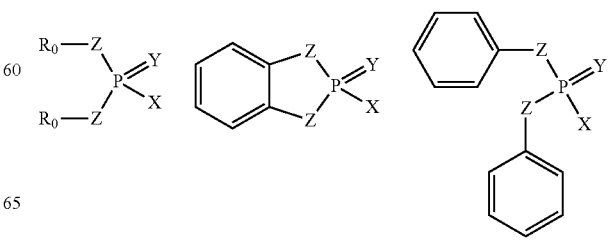

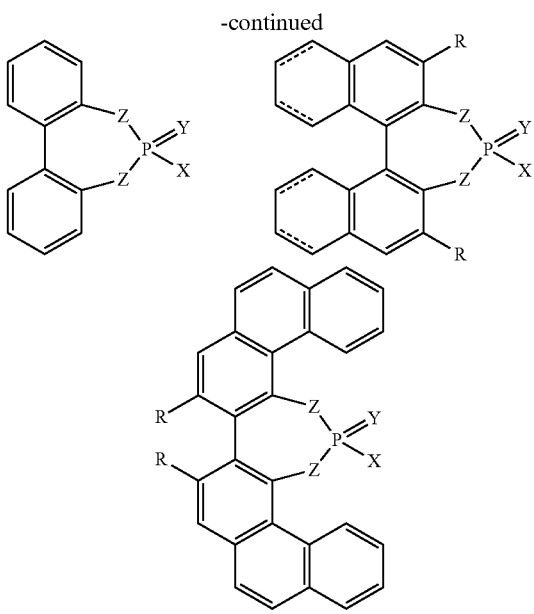

R₀ = Alkyl
X = OH, SH, (SeH), NHR' with R' = Ar, SO₂Ar, SO₂CF₃
Y = O, S, (Se)
Z = O, NR″ with R″ =

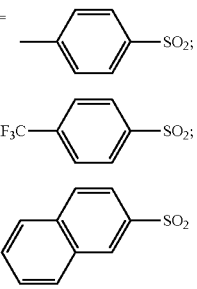

| | |
|---|---|
| R = H; Ph | 4-biphenyl- |
| 3,5-(Ph)2C6H3 | 1-naphthyl |
| 2,4,6-(Me)3—C6H2 | 2-naphthyl |
| 3,4,5-(Me)3—C6H2 | 9-anthryl |
| 2,4,6-(iPr)3—C6H2 | 9-phenanthryl |
| 3,5-(CF3)2—C6H2 | |
| 4-tBu-2,6-(iPr)2—C6H2 | |
| 4-tBu—C6H4 | |
| MeO—C6H4 | |
| NO2—C6H4 | |
| SiPh3 | |
| Si(tBu)(Ph)2 | |

These compounds can be chiral or nonchiral. In a preferred embodiment of the invention, when the substituted phosphorus-containing compound is chiral, the reaction can be stereocontrolled.

More particularly, diphenylphosphate is preferred, as well as (R)-3,3'-bis[3,5-bis(trifluoromethyl)phenyl]-1,1'-binaphthyl-2,2'-diyl hydrogen phosphate and the N-[(trifluoromethyl)sulfonyl]-, diphenyl ester of phosphoramidic acid.

It is preferably a process of homogeneous catalysis, in the sense that the catalyst is usually in the same phase as the reactants and not in supported form. The catalyst can easily be removed at the end of reaction by neutralization by means of a hindered organic base and then removal of the ammonium salts thus formed, preferably by washing with water.

It is preferable that the method according to the invention does not employ metallic species.

This method is preferably carried out at a temperature in the range from 0 to 230° C., more preferably from 25° C. to 105° C. and, even better, from 25° C. to 65° C.

This method is moreover preferably carried out with stirring in a solvent or in bulk. Carrying out this method in suspension or in emulsion in a suitable solvent would still be within the scope of the invention. The method of the invention can be carried out continuously, semi-continuously or in batch mode in a reactor, which can be an extruder. When it is carried out continuously, all of the reactants are introduced continuously at reactor inlet and the reaction products are discharged at reactor outlet.

When it is carried out semi-continuously, some of the reactants can be introduced continuously, such as the monomers and/or the catalyst.

When it is carried out in batch mode, all of the reactants are fed into the reactor at the same time, and the reaction products are discharged after the time necessary for the reaction (typically from 4 to 10 h).

The (co)polymers prepared according to the present invention have a number-average molecular weight, designated Mn, measured by gel permeation chromatography (or GPC), controlled by the molar ratio of the monomer to the initiator and which can be greater than 25 000 g/mol, and/or a polydispersity index, reflecting good homogeneity of chain lengths of the polymer, below 1.5.

They can be used in a variety of applications, and in particular as membranes for treatment of liquid or gaseous effluents or in electrochemical systems for energy storage such as lithium-ion batteries, supercapacitors or fuel cells; as biocompatible materials usable notably in the field of pharmaceuticals or cosmetics, in particular for manufacturing systems as vehicles for active substances or as suture material; as additives in plastics and in particular as antistatic additives for polymeric resins such as polyesters, polycarbonates, polyamides or poly(meth)acrylates, as compounds for improving the impact toughness of resins such as polycarbonates, whether or not transparent, polyesters, polyamides or poly(meth)acrylates, or as plasticizers of PVC; or for manufacturing textile fibers.

The invention will now be illustrated by the following nonlimiting examples.

EXAMPLES

Example 1: Preparation of Polylactones and Polycarbonates

Example 1A

A solution of ε-caprolactone (75 μl, 40 eq., 0.9 mol·l⁻¹) in CDCl₃ (425 μl) with pentanol (1.8 μl, 1 eq.) is poured into a solution of (R)-3-3'-bis[3,5-bis(trifluoromethyl)phenyl]-1,1'-binaphthyl-2,2'-diyl hydrogen phosphate (13 mg, 1 eq.). The reaction mixture is stirred under argon at 30° C. until there is complete conversion of the monomer, established on the basis of NMR, i.e. 4 h.
Conversion: ≥95%
$^1$H NMR: DP=33
GPC: $M_n$=7600 g/mol, PDI=1.09

Example 1B n-Pentanol (13 μl, 1 eq.) and diphenylphosphate (85 mg, 3 eq.) are added successively to a solution of ε-caprolactone (1 ml, 80 eq., 0.9 mol·l⁻¹) in toluene (9 ml). The reaction mixture is stirred under argon at 30° C. until there is complete conversion of the monomer, established on the basis of NMR, i.e. 3 h.
Conversion: ≥95%
$^1$H NMR: DP=76
GPC: $M_n$=16 000 g/mol, PDI=1.10

Example 1C n-Pentanol (15 μl, 1 eq.) and diphenylphosphate (26 mg, 1 eq.) are added successively to a solution of trimethylenecarbonate (550 mg, 40 eq., 0.9 mol·l$^{-1}$) in toluene (6 ml). The reaction mixture is stirred under argon at 30° C. until there is complete conversion of the monomer, established on the basis of NMR, i.e. 20 h.
Conversion: ≥95%
$^1$H NMR: DP=31 and 0% decarboxylation
GPC: $M_n$=6000 g/mol, PDI=1.05

Example 1D n-Pentanol (10 µl, 1 eq.) and N-[(trifluoromethyl)sulfonyl]-, diphenyl ester of phosphoramidic acid (103 mg, 3 eq.) are added successively to a solution of ε-caprolactone (400 µl, 40 eq., 0.9 mol·l$^{-1}$) in toluene (3.6 ml). The reaction mixture is stirred under argon at 30° C. until there is complete conversion of the monomer, established on the basis of NMR, i.e. 45 min. Then ε-caprolactone (400 µl, 40 eq.) is added to the reaction mixture. After complete conversion, 800 µl, 80 eq. is again introduced into the reaction mixture. Complete conversion is established by NMR 3 h after the last addition.
Conversion: ≥99%
$^1$H NMR: DP=148
GPC: $M_n$=26 500 g/mol, PDI=1.11

Example 1E

N-[(Trifluoromethyl)sulfonyl]-, diphenyl ester of phosphoramidic acid (34 mg, 1 eq.) is added to a solution of ε-caprolactone (400 µl, 40 eq., 0.9 mol·l$^{-1}$) in toluene (3.6 ml). The reaction mixture is stirred under argon at 30° C. until there is complete conversion of the monomer, established on the basis of NMR, i.e. 6 h.
Conversion: ≥99%
$^1$H NMR: DP=140
GPC: $M_n$=24 000 g/mol, PDI=1.34

Example 1F n-Pentanol (25 µl, 1 eq.) and N-[(trifluoromethyl)sulfonyl]-diphenyl ester of phosphoramidic acid (85 mg, 3 eq.) are added successively to a solution of ε-caprolactone (1 ml, 80 eq., 0.9 mol·l$^{-1}$) in toluene (9 ml). The reaction mixture is stirred under argon at 30° C. until there is complete conversion of the monomer, established on the basis of NMR, i.e. 3 h.
Conversion: ≥95%
$^1$H NMR: DP=62
GPC: $M_n$=12 600 g/mol, PDI=1.11

Example 1G: Continuous Polymerization n-Pentanol (25 µl, 1 eq.) and diphenylphosphate (56 mg, 1 eq.) are added successively to a solution of ε-caprolactone (250 µl, 10 eq., 0.9 mol·l$^{-1}$) in toluene (2.25 ml). The reaction mixture is stirred under argon at 30° C. A solution of ε-caprolactone (1.75 ml, 70 eq., 0.9 mol·l$^{-1}$) in toluene (17.25 ml) is added continuously at a flow rate of 0.03 ml/min for 10 h. Complete conversion of the monomer is established on the basis of NMR, 30 minutes after the end of addition, i.e. 10 h 30 min.
Conversion: ≥95%
$^1$H NMR: DP=59
GPC: $M_n$=12 100 g/mol, PDI=1.06

Example 1H: Continuous Polymerization n-Pentanol (25 µl, 1 eq.) and N-[(trifluoromethyl)sulfonyl]-diphenyl ester of phosphoramidic acid (90 mg, 1 eq.) are added successively to a solution of ε-caprolactone (250 µl, 10 eq., 0.9 mol·l$^{-1}$) in toluene (2.25 ml). The reaction mixture is stirred under argon at 30° C. A solution of ε-caprolactone (1.75 ml, 70 eq., 0.9 mol·l$^{-1}$) in toluene (17.25 ml) is added continuously at a flow rate of 0.06 ml/min for 5 h. Complete conversion of the monomer is established on the basis of NMR, 15 minutes after the end of addition, i.e. 5 h 15 min.
Conversion: ≥95%
$^1$H NMR: DP=68
GPC: $M_n$=13 700 g/mol, PDI=1.09

Example 2: Preparation of Polylactones and Polycarbonates at High Temperature

Example 2A n-Pentanol (13 µl, 1 eq.) and diphenylphosphate (85 mg, 3 eq.) are added successively to a solution of ε-caprolactone (1 ml, 80 eq., 0.9 mol·l$^{-1}$) in toluene (9 ml). The reaction mixture is stirred under argon at 80° C. until there is complete conversion of the monomer, established on the basis of NMR, i.e. 1 h 30 min.
Conversion: ≥95%
$^1$H NMR: DP=80
GPC: $M_n$=16 000 g/mol, PDI=1.11

Example 2B n-Pentanol (7 µl, 1 eq.) and diphenylphosphate (34 mg, 2 eq.) are added successively to a solution of trimethylenecarbonate (550 mg, 80 eq., 0.9 mol·l$^{-1}$) in toluene (6 ml). The reaction mixture is stirred under argon at 80° C. until there is complete conversion of the monomer, established on the basis of NMR, i.e. 6 h.
Conversion: ≥95%
$^1$H NMR: DP=60 and 0% decarboxylation
GPC: $M_n$=10 200 g/mol, PDI=1.08

Example 2C n-Pentanol (25 µl, 1 eq.) and N-[(trifluoromethyl)sulfonyl]-diphenyl ester of phosphoramidic acid (85 mg, 1 eq.) are added successively to a solution of ε-caprolactone (1 ml, 80 eq., 0.9 mol·l$^{-1}$) in toluene (9 ml). The reaction mixture is stirred under argon at 80° C. until there is complete conversion of the monomer, established on the basis of NMR, i.e. 5 h.
Conversion: ≥100%
$^1$H NMR: DP=67
GPC: $M_n$=13 950 g/mol, PDI=1.14

Example 3: Preparation of Copolymers Based on Polylactones

Polyethylene glycol ($M_n$=2000, IP=1.06) (75 mg, 1 eq.) and N-[(trifluoromethyl)sulfonyl]-, diphenyl ester of phosphoramidic acid (34 mg, 1 eq.) are added successively to a solution of ε-caprolactone (400 µl, 40 eq., 0.9 mol·l$^{-1}$) in toluene (3.6 ml). The reaction mixture is stirred under argon at 30° C. until there is complete conversion of the monomer, established on the basis of NMR, i.e. 1 h 30 min.
Conversion: ≥99%
GPC: $M_n$=6500 g/mol, PDI=1.13

The invention claimed is:
1. A method for preparing a (co)polymer from at least one cyclic monomer selected from the group consisting of a lactone, a lactam, a carbonate, a lactide, a glycolide, an oxazoline, an epoxide, and a cyclosiloxane, wherein the method comprises a step of polymerizing, without using as a catalyst any metal compounds or species, the cyclic monomer or monomers, wherein a substituted phosphorus-containing compound selected from the following compounds is used as a catalyst for the polymerizing:

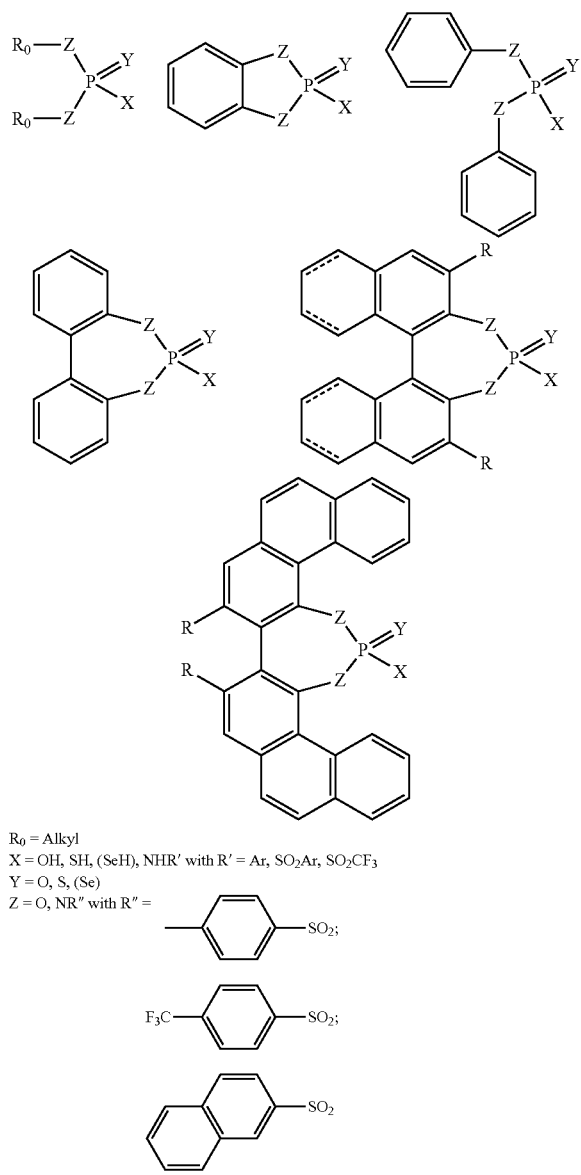

2. The method as claimed in claim 1, wherein an initiator is used.

3. The method as claimed in claim 1, wherein the cyclic monomer is selected from saturated or unsaturated, substituted or unsubstituted β-, γ-, δ- and ε-lactones, having from 4 to 11 carbon atoms.

4. The method as claimed in claim 3, wherein the cyclic monomer is ε-caprolactone.

5. The method as claimed in claim 1, wherein the cyclic monomer is a lactam selected from the group consisting of caprolactam, enantholactam, lauryllactam, pyrrolidinone and piperidone.

6. The method as claimed in claim 1, wherein the cyclic monomer is a cyclic carbonate of the following formula I:

$$\text{(I)}$$

where R denotes a linear alkyl group containing from 2 to 20 carbon atoms or a branched alkyl or alkaryl group containing from 2 to 20 carbon atoms, optionally substituted with one or more substituents selected independently from oxo and halo groups.

7. The method as claimed in claim 1, wherein the cyclic monomer is selected from the group consisting of lactides in racemic, enantiomerically pure or meso form.

8. The method as claimed in claim 1, wherein the cyclic monomer is glycolide.

9. The method as claimed in claim 2, wherein the initiator is water, pentanol or a polymer bearing at least one hydroxyl function.

10. The method as claimed in claim 2, wherein the initiator is selected from the group consisting of (alkoxy) polyalkylene glycols; poly(alkyl)alkylene adipate diols; optionally hydrogenated, α-hydroxylated or α,ω-dihydroxylated polydienes; mono- and polyhydroxylated polyalkylenes; polylactides containing terminal hydroxyl functions; polyhydroxyalkanoates; polysaccharides and mono- and oligo-saccharides, modified or unmodified; and mixtures thereof.

11. The method as claimed in claim 2, wherein the inititiator is a polymer bearing at least one hydroxyl function selected from the group consisting of (methoxy)polyethylene glycol, polypropylene glycol, polytetramethylene glycol, poly(2-methyl-1,3-propylene adipate)diol, poly(1,4-butylene adipate)diol, polybutadiene α,ω-dihydroxylated, polyisoprene α,ω-dihydroxylated, mono- and polyhydroxylated polyisobutylene, poly(3-hydroxybutyrate), poly(3-hydroxyvalerate), starch, chitin, chitosan, dextran, cellulose, sucrose, and isomaltulose and mixtures thereof.

12. The method as claimed in claim 2, wherein the initiator is a polymer bearing at least one thiol function.

13. The method as claimed in claim 12, wherein the initiator is selected from the group consisting of α-thiolated and α,ω-thiolated polystyrenes, α-thiolated and α,ω-thiolated poly(meth)acrylates, α-thiolated and α,ω-thiolated polybutadienes, and mixtures thereof.

14. The method as claimed in claim 2, wherein the initiator is a vinyl co-oligomer or copolymer from the family of acrylic, methacrylic, styrene or diene polymers, resulting from copolymerization between acrylic, methacrylic, styrene or diene monomers and functional monomers having either a hydroxyl group, or a thiol group.

15. The method as claimed in claim 1, wherein the substituted phosphorus-containing compound is diphenylphosphate.

16. The method as claimed in claim 1, wherein the substituted phosphorus-containing compound is (R)-3,3'-bis[3,5-bis(trifluoromethyl)phenyl]-1,1'-binaphthyl-2,2'-diyl hydrogen phosphate.

17. The method as claimed in claim 1, wherein the substituted phosphorus-containing compound is N-[(trifluoromethyl)sulfonyl]-,diphenyl ester of phosphoramidic acid.

18. The method as claimed in claim 1, wherein the molar ratio of the cyclic monomer to the polymeric initiator is in the range from 5 to 500.

19. The method as claimed in claim 2, wherein the molar ratio of the substituted phosphorus-containing compound to each hydroxyl or thiol function of the initiator is from 1 to 3.

20. The method as claimed in claim 1, the reaction is carried out at a temperature in the range from 0° C. at 230° C.

21. A method for improving the antistatic properties of a polymeric resin, improving the impact toughness of a resin, or plasticizing PVC, comprising using a copolymer prepared in accordance with the method of claim 1 as an additive.

* * * * *

UNITED STATES PATENT AND TRADEMARK OFFICE
CERTIFICATE OF CORRECTION

PATENT NO. : 9,738,751 B2  
APPLICATION NO. : 14/421069  
DATED : August 22, 2017  
INVENTOR(S) : Christophe Navarro et al.

Page 1 of 1

It is certified that error appears in the above-identified patent and that said Letters Patent is hereby corrected as shown below:

In the Claims

At Column 11, Line 19 (Claim 20), wherein "at" should read -- "to" --

Signed and Sealed this  
Seventh Day of November, 2017

Joseph Matal  
*Performing the Functions and Duties of the*  
*Under Secretary of Commerce for Intellectual Property and*  
*Director of the United States Patent and Trademark Office*